United States Patent
Königsson

(10) Patent No.: US 10,046,336 B2
(45) Date of Patent: Aug. 14, 2018

(54) SCRUBBER FLUID TREATMENT PROCESS

(71) Applicant: ALFA LAVAL CORPORATE AB, Lund (SE)

(72) Inventor: Staffan Königsson, Tumba (SE)

(73) Assignee: ALFA LAVAL CORPORATE AB, Lund (SE)

(*) Notice: Subject to any disclaimer, the term of this patent is extended or adjusted under 35 U.S.C. 154(b) by 475 days.

(21) Appl. No.: 14/735,944

(22) Filed: Jun. 10, 2015

(65) Prior Publication Data
US 2016/0361727 A1 Dec. 15, 2016

(51) Int. Cl.
*B01D 53/96* (2006.01)
*B01D 53/14* (2006.01)
(Continued)

(52) U.S. Cl.
CPC .......... *B04B 13/00* (2013.01); *B01D 53/1425* (2013.01); *B01D 53/96* (2013.01); *B04B 1/08* (2013.01); *B04B 11/02* (2013.01); *B01D 53/1481* (2013.01); *B01D 53/504* (2013.01); *B01D 2251/304* (2013.01);
(Continued)

(58) Field of Classification Search
CPC .......... B04B 13/00; B04B 11/02; B04B 1/08; B01D 53/96; B01D 53/1425; B01D 2251/602; B01D 2258/01; B01D 2252/1035; B01D 53/1481; B01D 2251/604; B01D 2257/302;
(Continued)

(56) References Cited

U.S. PATENT DOCUMENTS

| 4,689,157 A | 8/1987 | Tenthoff |
| 2013/0037493 A1* | 2/2013 | Konigsson ........... B01D 21/262 210/787 |
| 2013/0157833 A1 | 6/2013 | Königsson et al. |

FOREIGN PATENT DOCUMENTS

| EP | 2711067 A1 * | 3/2014 | ............ B01D 53/92 |
| JP | 62-10189 A | 1/1987 | |

(Continued)

OTHER PUBLICATIONS

PureNOx Prime, 100 Series, "Quotation Documentation", Alfa Laval Tumba AB, Printed Mar. 2015, Book No. 9018591-02 V1, pp. 1-33.

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

A system for cleaning polluted scrubber fluid includes a disc stack centrifugal separator a separator inlet for polluted scrubber fluid, a first separator outlet for cleaned scrubber fluid, and a second separator outlet for a pollutant phase. A first transportation system transports polluted scrubber fluid to the separator inlet, a second transportation system transports cleaned scrubber fluid back to the exhaust gas scrubber, a bleed-off transportation system connected to the second transportation system bleeds off part of the cleaned scrubber fluid, a dirty drain tank connected to the bleed-off transportation system receives the bled-off scrubber fluid, and a waste reduction transportation system transports scrubber fluid from the dirty drain tank to the first transportation system. A controller receives information related to the work load of the disc stack centrifugal separator and regulates the transport of scrubber fluid based on the information.

20 Claims, 3 Drawing Sheets

(51) Int. Cl.
*B04B 13/00* (2006.01)
*B04B 1/08* (2006.01)
*B04B 11/02* (2006.01)
*B01D 53/50* (2006.01)

(52) U.S. Cl.
CPC .. *B01D 2251/404* (2013.01); *B01D 2251/602* (2013.01); *B01D 2251/604* (2013.01); *B01D 2252/103* (2013.01); *B01D 2252/1035* (2013.01); *B01D 2257/302* (2013.01); *B01D 2258/01* (2013.01); *B01D 2259/4566* (2013.01)

(58) Field of Classification Search
CPC ........ B01D 2251/404; B01D 2251/304; B01D 2259/4566; B01D 53/504; B01D 2252/103
USPC .................................. 494/1, 2, 3, 10, 35, 37
See application file for complete search history.

(56) References Cited

FOREIGN PATENT DOCUMENTS

| | | |
|---|---|---|
| JP | 3-293045 A | 12/1991 |
| JP | 6-99102 A | 4/1994 |
| JP | 11-62554 A | 3/1999 |
| JP | 2004-138874 A | 5/2004 |
| JP | 2004-249277 A | 9/2004 |
| JP | 2012-192346 A | 10/2012 |
| JP | 2013-534866 A | 9/2013 |
| JP | 2015-80755 A | 4/2015 |
| JP | 2015-116529 A | 6/2015 |
| KR | 10-1486882 B1 | 1/2015 |
| WO | WO 2012/000790 A1 | 1/2012 |
| WO | WO 2014/048723 A1 | 4/2014 |
| WO | WO 2014/135509 A1 | 9/2014 |

* cited by examiner

SCRUBBER FLUID TREATMENT PROCESS

FIELD OF THE INVENTION

The present invention relates to the field of exhaust gas cleaning systems and methods.

BACKGROUND OF THE INVENTION

The shipping industry of today strives to reduce harmful emissions, such as emissions originating from the combustion of fuel in the engine, in order to minimize the negative environmental impact and fulfill present and upcoming emission regulations.

One part in this is the reduction in sulphuric oxide ($SO_X$) emissions from ships. Sulphuric oxides are created in the combustion of fuels containing sulphuric residues. The amount of sulphuric oxides in exhaust gas can be reduced by exhaust gas cleaning, e.g. by using scrubbers. The process of cleaning exhaust gas with the aid of the mentioned scrubbers produces polluted scrubber fluid.

Another object is the reductions in nitrogen oxides ($NO_X$) emissions from marine engines. This can be done by implementing Exhaust Gas Recirculation (EGR), where part of the exhaust gas is recirculated to the combustion chamber of the engine. However, the amount of soot and particles in the exhaust gas needs to be decreased. It is therefore desirable to clean the exhaust gas, which can be done by using a scrubber. Also in this process polluted scrubber fluid is produced.

One problem is thus to improve the cleaning of the scrubber fluid. One further aspect of improving the cleaning of the scrubber fluid is to minimize the risk of pollutants being carried over from the scrubber fluid back into the exhaust gas where it may cause problems in downstream equipment such as coolers. A further problem is that particles in polluted scrubber fluid tend to adhere on process equipment and piping over time with the risk of a build-up of soot scaling resulting in malfunctioning process equipment, sensors, transmitters and the like. Equipment for cleaning scrubber fluid includes filter technology and centrifugal separators. However, equipment relying on filter technology has the drawback in the need for surveillance, service and replacement of filter components.

Further, during scrubbing of hot/warm exhaust gases by means of a wet scrubber, moisture in the exhaust gas may condensate into water, adding to the volume of scrubber fluid in the scrubber process. Further, various salts from the exhaust gas tend to be dissolved in the scrubber fluid in the scrubbing process. To reduce the risk of salt precipitates, the fluid may need to be diluted whereby the volume of scrubber fluid increases.

Fluid may thus be added to the scrubber fluid loop from the exhaust gas and/or due to deliberate addition of fluid to the system. To maintain the volume of scrubber fluid in the system, scrubber fluid has to be bled off from the scrubber process. However, the scrubber fluid may have to fulfill certain criteria, such as the IMO MEPC 184(59) criteria, to be discharged overboard.

SUMMARY OF THE INVENTION

The present disclosure provides a system for cleaning polluted scrubber fluid from an exhaust gas scrubber, comprising a disc stack centrifugal separator for separating at least a pollutant phase and cleaned scrubber fluid from the polluted scrubber fluid, the separator comprising a rotor enclosing a separation space with a stack of separating discs, a separator inlet for polluted scrubber fluid extending into the separating space, a first separator outlet for cleaned scrubber fluid extending from the separating space, and a second separator outlet for a pollutant phase extending from the separating space, a first transportation system for transporting polluted scrubber fluid from an exhaust gas scrubber to the separator inlet, a second transportation system for transporting cleaned scrubber fluid from the first separator outlet back to the exhaust gas scrubber, a bleed-off transportation system connected to the second transportation system for bleeding off part of the cleaned scrubber fluid, a dirty drain tank connected to the bleed-off transportation system for receiving bled-off scrubber fluid, a waste reduction transportation system for transporting scrubber fluid from the dirty drain tank to the first transportation system, and a control unit arranged for receiving information related to the work load of the disc stack centrifugal separator and for regulating the transport of scrubber fluid in the waste reduction transportation system based on the information.

The scrubber fluid may be a liquid such as water, but can also be other suitable liquids. Scrubber fluid as initially included in the process of cleaning exhaust gas, or as added to the process during operation, may be tap water, fresh water or desalinated seawater.

The scrubber fluid may be water having an amount of chlorides less than, or much less than sea water. Tap water can be provided from tanks or produced on board by desalination of seawater. The scrubber fluid may however contain salts included from the scrubber process. The term scrubber fluid refers to cleaned or polluted scrubber fluid, scrubber fluid initially included in the process or added to the process, or combinations thereof. Pollutants in the scrubber fluid may comprise solid and/or liquid particles comprising organic or inorganic combustion residues such as sulphuric oxide residues, soot, partly oxidized and unoxidized marine fuel oil and salts from oxidized metals. Particles generated in the combustion in the engine are normally very small, below the µm scale and typically within the range of from about 10 to about 30 nm. In a suitable fluid such as water they agglomerate into clusters within the µm scale such as within the range from about 5 to about 100 µm, particularly within the range from about 10 to about 30 µm.

Polluted scrubber fluid may thus be water polluted with oil and pollutant particles, such as pollutant organic particles. Cleaned scrubber fluid may thus be water having a lower amount of oil and pollutant particles, such as pollutant organic particles.

Cleaned scrubber fluid has a reduced amount of pollutants, but may still comprise a low amount of pollutants and a pollutant phase separated from the polluted scrubber fluid may still comprise a certain amount of scrubber fluid. The pollutant phase may be denser, i.e. having a higher density, than the cleaned scrubber fluid.

The polluted scrubber fluid, such as polluted scrubber liquid, may be from an exhaust gas scrubber fluid loop. An exhaust gas scrubber fluid loop may be a closed scrubber fluid loop, i.e. a circulation system providing recirculation of scrubber fluid through the scrubber and other components within the system. The scrubber fluid loop may include scrubbers used to clean the full flow of exhaust gas from an engine and/or scrubbers used to clean part of the flow of exhaust gas from an engine e.g. during EGR.

The disc stack centrifugal separator comprises a rotor, rotatably arranged around an axis of rotation, enclosing (i.e. forming within itself) a separation space with a stack of separating discs or a set of separating plates. The separating discs or plates may be frusto-conical or have any other suitable shape. The separator further comprises a separator inlet for polluted scrubber fluid extending into the separating space, a first separator outlet for cleaned scrubber fluid extending from the separating space, and a second separator outlet for a pollutant phase extending from the separating space. The first separator outlet preferably extends from a radially inner portion of the separating space with respect to the axis of rotation, and the second separator outlet preferably extends from a radially outer portion of the separating space. The separator may further be provided with a third separator outlet for another fluid phase which is denser or lighter than the scrubber fluid, such as oil. The separator may further be free of any third outlets, i.e. comprising single first outlet for the cleaned scrubber fluid and a single second outlet for a single pollutant phase.

Further, the disc stack centrifugal separator may be an intermittently discharging separator in which the second separator outlet comprises one or more discharge ports that may be opened during operation to intermittently discharge polluted phase from the separating space, or a nozzle separator, wherein the second separator outlet comprises one or more discharge nozzles for continuous discharge of polluted phase from the separating space. The discharge ports or discharge nozzles may preferably extend from an outer radius of the separating space to the outside of the rotor for discharge of a separated phase with density higher than the cleaned scrubber fluid, i.e. the pollutant phase.

The disc stack centrifugal separator may further comprise a conveyor screw. For example, the rotor of the separator may enclose a conveyor screw which is arranged to be driven at a rotational speed differing from the rotational speed of the rotor so that to convey the pollutant phase, i.e. a separated phase with density higher than the cleaned scrubber fluid, towards the second separator outlet. The second separator outlet may then be provided on a smaller radius than the outer radius of the separating space, and the conveyor screw arranged to convey the pollutant phase radially inwards and towards the second separator outlet. The conveyor screw may be arranged to be driven at a rotational speed differing from the rotational speed of the rotor at least during a discharge operation of the separator.

The pollutant phase discharged from the separator may have a concentration of particles of 20-65 weight percent (corresponding to approximately 45-95 volume percent).

The first transportation system is for transporting polluted scrubber fluid to the disc stack centrifugal separator and may thus comprise pipes and pumps etc.

The second transportation system is for transporting cleaned scrubber fluid back to the scrubber and may thus also comprise pipes and pumps etc. However, the first and second transportation system may share a common buffer tank. The buffer tank may be part of the exhaust gas scrubber. The first and second transportation systems may thus be arranged so as to transport polluted scrubber fluid to the disc stack centrifugal separator from a buffer tank of an exhaust gas scrubber and arranged for transporting cleaned scrubber fluid back to the scrubber via the buffer tank. This means that all of the polluted scrubber fluid to be cleaned is led from the scrubber to the buffer tank, and all of the cleaned scrubber fluid is led from the separator to the same buffer tank. In other words, the system may include a tank to which both a separate cleaning loop and a separate scrubber loop is connected. In other words, the disc stack centrifugal separator may not be in direct liquid contact with the scrubber, but instead communicate via the buffer tank.

The bleed-off transportation system may be connected to the second transportation system via a valve, such as a three-way valve, in order to bleed off scrubber fluid from the system. Since water is formed in the combustion, the total water amount in the scrubber system may increase over time. With the bleed-off transportation system, scrubber fluid may be led to e.g. a dirty drain tank. The dirty drain tank may be a tank for storing bled-off scrubber fluid that does not fulfill requirements for e.g. being transported overboard the ship. The dirty drain tank may also be a tank that functions as a back-up storage tank for cleaned scrubber water, which may or may not fulfill any quality criteria, at times when the ship is not allowed to discharge any water overboard.

The waste reduction transportation system may also comprise pipes and pumps etc. and is for transporting scrubber fluid from the dirty drain tank back to a position upstream of the disc stack centrifugal separator so that scrubber fluid that e.g. do not fulfill certain quality requirements, may be retreated when process capacity is available. This may for example be when the scrubber is not utilized and/or when polluted scrubber fluid is not led to the disc stack centrifugal separator in the first transportation system. The waste reduction transportation system may be connected to the first transportation system upstream of a feed pump in the first transportation system so that the feed pump in the first transportation system may be used also for transporting scrubber fluid in the waste reduction transportation system. The waste reduction transportation system may thus be free of a pumping means.

The transport of scrubber fluid from the dirty drain tank to the first transportation system is regulated by a control unit. The control unit may comprise a processor and an input/output interface for communicating with the disc stack centrifugal separator in order to receive information on the operational status of the separator.

Information related to the work load of the centrifugal separator may be information from the separator itself, such as direct information if the separator is running or not, or it may be information that is indirectly related to the work load of the separator. For example, such indirect information may be information about whether the scrubber is running or not or information about the engine load of the ship in which the system is installed. If there is capacity available, the control unit may initiate transport of scrubber fluid from the dirty drain tank to the first transportation system via the waste reduction transportation system. The waste reduction transportation system may be connected to the first transportation by means of a valve, such as a three-way valve. Thus, the processor may be adapted to access data from the control unit and generate and transmit control signals to such a valve and/or to a pump in the waste reduction transportation system.

The system of the present disclosure is advantageous in that it allows for retreating cleaned scrubber fluid in the dirty drain tank so that it may eventually fulfil all overboard discharge criteria, i.e. it aids in decreasing the total amount of scrubber fluid on-board a ship that have to be disposed of ashore.

The system may comprise a single centrifugal separator that may both treat the polluted scrubber fluid and retreat fluid from the dirty drain tank. The system may thus bee free of further separation means, such as free of further filters or centrifugal separators.

According to embodiments, the system further comprises scrubber fluid quality control equipment connected to the bleed-off transportation system for measuring at least one property of the scrubber fluid in the bleed-off transportation system.

The scrubber fluid quality control equipment may be arranged for measuring one or several of the parameters pH, PAH (Polycyclic aromatic hydrocarbons) and turbidity.

Furthermore, the system may comprise an overboard transportation system for transporting scrubber fluid in the bleed-off transportation system overboard, and the control unit may be further arranged for receiving information from the scrubber fluid quality control equipment and for regulating the transport of cleaned scrubber fluid between the dirty drain tank and overboard based on the information from the scrubber fluid quality control equipment.

Thus, the overboard transportation system may be connected to the bleed-off transportation system via a valve, such as a three-way valve, and a processor in the control unit may be adapted to access data from the fluid quality control equipment and generate and transmit control signals to such a valve and/or to a pump in the bleed-off transportation system so that cleaned scrubber fluid is led overboard instead of to the dirty drain tank. Thus, when there is capacity, the control unit may that scrubber fluid in the dirty drain tank, such as cleaned scrubber fluid that does not fulfil the quality criteria to be discharged overboard, is retreated in the disc stack centrifugal separator one or several times until the quality criteria are fulfilled. The scrubber fluid may then be discharged overboard and the waste volume otherwise sent for disposal ashore is reduced.

According to embodiments, the second separator outlet of the disc stack centrifugal separator is arranged at the periphery of the separation space and wherein the system further comprises a discharge waste tank connected to the second separator outlet.

The discharge tank may thus be connected e.g. by means of piping to the second separator outlet. The second separator outlet may thus be in the form of discharge ports or discharge nozzles extending from an outer radius of the separating space to the outside of the rotor for discharge of a pollutant phase with density higher than the cleaned scrubber fluid.

As an example, the discharge waste tank may be the same as the dirty drain tank. Thus, there may be only one common waste tank available, i.e. there may be a combined dirty drain and discharge tank. The waste reduction transportation system may then be connected at a safe distance up from the tank bottom to avoid solids formed in the combined tank to be transported back via the waste reduction transportation system. As an example, the waste reduction transportation system may be connected to the combined tank such that a liquid phase is withdrawn from a position from the bottom of the tank that is above 20% of the total tank height.

If the discharge waste tank and the dirty drain tank are different tanks, then, the system may comprise a liquid transportation system from the discharge waste tank to the dirty drain tank. This may be advantageous e.g. if the pollutant phase discharged via the second outlet still comprises scrubber fluid, such as water. Thus, the discharge waste tank may be "drained", i.e. leaving the bottom phase, to the dirty drain tank to even further reduce the total waste for disposal.

According to embodiments, the system further comprises a chemical addition unit connected to the first transportation system for addition of a pH regulating additive to the scrubber fluid in the first transportation system. The chemical addition unit may be arranged for controlling and/or regulating the acidity of the scrubber fluid in the first transportation system that is about to be cleaned in the disc stack centrifugal separator. The chemical addition unit may be arranged to keep the pH above 6.5, and may further be arranged to keep the pH below 8. The chemical addition unit may thus be arranged to keep the pH within the range of 6.5-8. In one aspect, this may be done in order to compensate for acidic components, such as $SO_X$, in the exhaust gas which may cause the scrubber fluid pH to decrease. The acidity may be controlled and/or regulated by measuring and adjusting the pH, by adding a pH regulating compound such as NaOH (sodium hydroxide), CaO (calcium oxide) or $Ca(OH)_2$ (calcium hydroxide). The acidity of the scrubber fluid in the first transportation system may be controlled and/or regulated in order to facilitate the precipitation of a certain amount of dissolved salts and thus to maintain good separation process in the disc stack separator.

In embodiments, the bleed-off transportation system is free of any further centrifugal separator.

The bleed-off transportation system may further be free of any further separation means, such as filters. Thus, the system may only require a single separator since the system allows scrubber fluid that does not fulfil quality criteria to be transported from the dirty drain tank back to the first transportation system. Hence, no further separator for treating the scrubber fluid in the bleed off may be necessary.

According to embodiments, the system further comprises a unit for addition of coagulant and/or flocculants to the first transportation system. The coagulant or flocculant facilitates agglomeration of particles in the polluted scrubber fluid and may be a polyelectrolyte.

Furthermore, the cleaning equipment may comprise means for adding a precipitant to the first transportation system, i.e. upstream of the separator inlet. The precipitant preferably adds trivalent ions, such as trivalent iron or trivalent aluminium to the scrubber fluid and may comprise aluminium sulphate, (poly)aluminium chloride and/or iron chloride. Thereby dissolved salts may be precipitated from the polluted scrubber fluid, further increasing the separation efficiency in the disc stack centrifugal separator.

According to embodiments the second separator outlet of the disc stack centrifugal separator is arranged at the periphery of the separation space and the separator is free of any further outlets for pollutant phases.

The centrifugal separator may thus be of a clarifier type having a single outlet for the cleaned scrubber fluid and a single type of outlet of the second type for a single pollutant phase. Thus, lighter liquid organic residues in the scrubber fluid, such as oil, may adhere to denser solid particles in the fluid in a way that makes it possible, in the disc stack separator, to separate the oil and the solid particles as a pollutant phase which is denser than the scrubber fluid. It may be advantageous to use such a clarifier type of separator since it may have a larger through-put capacity compared to e.g. a three-phase separator that is arranged separate the polluted scrubber fluid into clean scrubber fluid and two pollutant phases, such as a sludge phase and a separate oil phase.

The system of the present disclosure may be useful together with a diesel engine, such as a large engine on a ship, comprising a gas scrubber having an inlet for exhaust gas, a humidifying device for providing a scrubber fluid to the exhaust gas and a droplet separator for removing polluted scrubber fluid from the exhaust gas, a preferably closed scrubber fluid loop for circulating the scrubber fluid to the scrubber, connected to a system of the present disclosure. The system of the present disclosure is also applicable to similar land based scrubber installations for cleaning gas, such as exhaust gas.

The present disclosure also provides a method for cleaning polluted scrubber fluid from an exhaust gas scrubber on-board a ship comprising the steps of
- transporting polluted scrubber fluid from the exhaust gas scrubber to the inlet of a disc stack centrifugal separator,
- separating the polluted scrubber fluid in the disc stack centrifugal separator and discharging cleaned scrubber fluid from a first separator outlet and a pollutant phase from a second separator outlet,
- transporting cleaned scrubber fluid from the first separator outlet back to the exhaust gas scrubber,
- bleeding off part of the cleaned scrubber fluid that has been discharged from disc stack centrifugal separator to a dirty drain tank,
- transporting scrubber fluid from the dirty drain tank to a position upstream of the inlet of the disc stack centrifugal separator and retreating the scrubber fluid in the disc stack centrifugal separator and at the same time decreasing the transport of polluted scrubber fluid from the exhaust gas scrubber to the inlet of the disc stack centrifugal separator.

The terms and definitions used in connection with the above method are as discussed for the system above.

The term bleeding off refers to transporting a smaller part of the cleaned scrubber fluid, i.e. drawing off cleaned scrubber fluid from the main transport of cleaned scrubber fluid back to the scrubber fluid loop. Thus, the method may comprise transporting a larger volume or amount of cleaned scrubber fluid back to the scrubber fluid loop compared to the volume or amount that is bled-off during a specific period of time. The bleed off may comprise alternatively transporting cleaned scrubber fluid from the first separator outlet back to the exhaust gas scrubber fluid loop during a first period of time and then switching to transporting cleaned scrubber fluid that has been discharged from disc stack centrifugal separator to a dirty drain tank during a second period of time that is shorter than the first period of time. Decreasing the transport of polluted scrubber fluid from the exhaust gas scrubber to the inlet of the disc stack centrifugal separator may be stopping the transport of polluted scrubber fluid from the exhaust gas scrubber to the inlet of the disc stack centrifugal separator when scrubber fluid is transported from the dirty drain tank to a position upstream of the inlet of the disc stack centrifugal separator.

In embodiments, the method comprises
- measuring a parameter related to the quality of the cleaned scrubber fluid that has been bled-off before reaching the dirty drain tank and
- transporting the cleaned scrubber fluid that has been bled-off overboard instead of to the dirty drain tank if the measured parameter is within a specific range.

As discussed above, the cleaned scrubber fluid may be discharged overboard if certain quality criteria are fulfilled. The parameter may be one or several of the parameters pH, PAH (Polycyclic aromatic hydrocarbons) and turbidity, and the method may comprise transporting the cleaned scrubber fluid overboard if one or several of these parameters are within e.g. a predefined range, such as above or below a predefined threshold value.

In embodiments, the second separator outlet of the disc stack centrifugal separator is arranged at the periphery of the separation space and the method further comprises transporting the pollutant phase discharged through the second outlet to a discharge tank.

Further, the method may further comprise draining a liquid phase from such a discharge tank to the dirty drain tank. Thus, any liquid discharged in the pollutant phase may be sent to the dirty drain tank so that it may be retreated by the disc stack centrifugal separator As an example, the discharge tank may be the same as the dirty drain tank and the step of transporting scrubber fluid from the dirty drain tank comprises withdrawing a liquid phase from a position from the bottom of the tank that is above 20% of the total tank height and transporting the phase to a position upstream of the inlet of the disc stack centrifugal separator.

Thus, if there is a common discharge and dirty drain tank, it may be advantageous to decrease the risk of transporting any pollutant solid phase back upstream of the separator.

The method may further comprise, adjusting the pH of the scrubber fluid transported from the dirty drain tank to a position upstream of the inlet of the disc stack centrifugal separator before being retreated in the disc stack centrifugal separator.

Furthermore, the method may comprise subjecting the cleaned scrubber fluid to no further cleaning process after being bled off from the cleaned scrubber fluid and before being discharged overboard or before being subjected to any further retreatment in the disc stack centrifugal separator.

The method may further comprise discharging a single pollutant phase comprising oil and particles from the second separator outlet of the disc stack centrifugal separator, wherein the second separator outlet is arranged at the periphery of the separation space, and discharging the cleaned scrubber fluid from the first separator outlet. A discussed above, if lighter liquid organic residues in the scrubber fluid, such as oil particles, adhere to denser solid particles in the scrubber fluid it may be possible to separate the oil and the solid particles as a single pollutant phase from the separator.

The method may further comprise adding a coagulant or flocculant, such as a polyelectrolyte, to the polluted scrubber fluid before separating the polluted scrubber fluid in the disc stack centrifugal separator. This may aid in separating the pollutant phase from the polluted scrubber fluid.

DETAILED DESCRIPTION

The system and method according to the present disclosure will be further illustrated by the following description with reference to the accompanying drawings.

Figure 1:
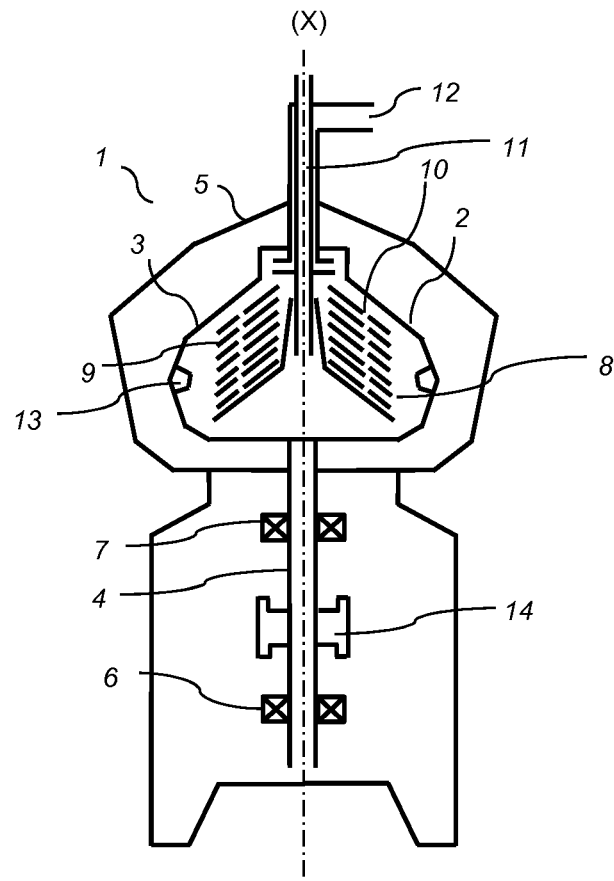
FIG. 1 shows a schematic drawing of a disc stack centrifugal separator that may be used in a system of the present disclosure.

FIG. 1 shows a schematic drawing of a disc stack centrifugal separator that may be used in the system.

The centrifugal separator 1 comprises a rotating part 2 arranged for rotation about an axis of rotation (X) and comprises rotor 3 and spindle 4. The spindle 4 is supported in the frame 5 of the centrifugal separator in a bottom bearing 6 and a top bearing 7.

The rotor 3 forms within itself a separation chamber 8 in which centrifugal separation of e.g. polluted scrubber water to takes place during operation.

The separation chamber 8 is provided with a stack of frusto-conical separation discs 9 in order to achieve effective separation of the liquid. The stack of truncated conical separation discs 9 are examples of surface-enlarging inserts. These discs 9 are fitted centrally and coaxially with the rotor and comprise holes which form channels 10 for axial flow of liquid when the separation discs 9 are fitted in the centrifugal separator 1.

Liquid mixture to be separated is fed from the top via stationary inlet pipe 11 extending down into the rotor 3.

The rotor 3 has extending from it a liquid light phase outlet 12 for a lower density component separated from the liquid extending through the frame 5 at the top of the separator. In this example, the separator has only one liquid outlet 13, but the separator could also comprise further liquid outlets for liquid phases of other densities than the density of the liquid withdrawn via outlet 12. This depends on the liquid material that is to be processed. In such cases, any liquid of higher density may instead be forced out through a further liquid outlet (not shown) that is at a radial distance that is larger than the radial level of outlet 13. As an example, a further liquid outlet may be utilized if oil is separated from the polluted scrubber fluid as a separate liquid phase.

The rotor 3 is provided at its outer periphery with a set of radially sludge outlets 13 in the form of intermittently openable outlets for discharge of higher density component such as sludge or other solids in the liquid. This material is thus discharged from a radially outer portion of the separation chamber 8 to the space round the rotor 3.

The centrifugal separator 1 is further provided with a drive motor 16. This motor 14 may for example comprise a stationary element and a rotatable element, which rotatable element surrounds and is so connected to the spindle 4 that during operation it transmits driving torque to the spindle 4 and hence to the rotor 3. The drive motor 14 may be an electric motor. Furthermore, the drive motor 14 may be connected to the spindle 4 by transmission means such as drive belts or the like, and the drive motor may alternatively be connected directly to the spindle.

During operation of the separator in FIG. 1, the rotor 3 is caused to rotate by torque transmitted from the drive motor 14 to the spindle 4. Via the central duct 11 of the spindle 4, polluted scrubber liquid to be separated is brought into the separation space 8 e.g. when the rotor is already running at its operational speed. Liquid material may thus be continuously introduced into the rotor 3.

Depending on the density, different phases in the liquid is separated between the separation discs 9 fitted in the separation space 8. Heavier components in the liquid, i.e. the pollutant phase comprising particles and oil agglomerated to the particles, move radially outwards between the separation discs, whereas the phase of lowest density, such as cleaned scrubber water, moves radially inwards between the separation discs and are forced through outlet 12. Thus, during separation, an interphase between is formed in the separation space 8. The pollutant phase comprising particles and oil accumulate at the periphery of the separation chamber 8 and is emptied intermittently from the separation space by the sludge outlets 13 being opened, whereupon the pollutant phase and a certain amount of liquid is discharged from the separation space by means of centrifugal force. However, the discharge of a pollutant phase may also take place continuously, in which case the sludge outlets 13 take the form of open nozzles and a certain flow of pollutant phase is discharged continuously by means of centrifugal force.

Figure 2:
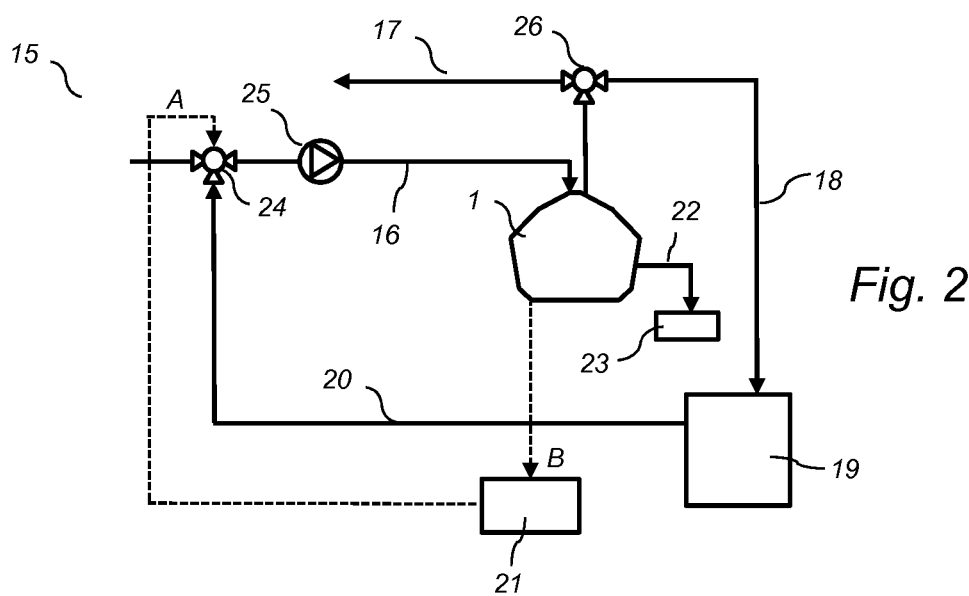
FIG. 2 shows a schematic drawing of an embodiment of a system of the present disclosure.

FIG. 2 shows a schematic view of a system 15 of the present disclosure for treating exhaust gas scrubber water. The system comprises a first transportation system 16, which comprises pipes and a feed pump 25 for transporting polluted scrubber liquid to the disc stack centrifugal separator 1. The disc stack centrifugal separator is of a clarifier type, meaning that it discharges a pollutant phase from the periphery of the separating space via pipes 22 to the discharge tank 23. In this case, oil and particles are discharged in the same, single pollutant phase, whereas cleaned scrubber water is discharged via a liquid outlet at the top of the separator 1 and is transported via a second transportation system 17 back to the scrubber. The second transportation system 17 comprises pipes and a three-way valve 26, so that a smaller part of the cleaned scrubber water may be bled off via bleed-off transportation system to a dirty drain tank 19. Thus, valve 26 may be changed so that it directs the cleaned scrubber water via transportation system 17 during a longer period of time than directing the cleaned scrubber water via bleed-off transportation system 18. The system further comprises a control unit that receives information related to the work load of the separator 1, as indicated by arrow B. When the centrifugal separator 1 has capacity, e.g. when the scrubber is not utilized, the control unit 21 initiates transport of scrubber water in dirty drain tank 19 via a waste reduction transportation system 20 comprising pipes back to a position that is upstream of the centrifugal separator 1, in this case to the first transportation system 16. This is achieved by controlling the three-way valve 24 in the first transportation system, as indicated by arrow A. The three way valve 24 is arranged upstream of the pump 25, so that the feed pump 25 may be utilized for transporting the scrubber water from the dirty drain tank to the separator 1 in order to retreat the scrubber water in the separator. As an alternative, the waste reduction transportation system 20 may comprise a pump of its own (not shown). Further, the control unit may also regulate the three-way valve 26 in the second transportation system 17, i.e. to regulate when to bleed-off the cleaned scrubber water in the second transportation system 17.

Figure 3:
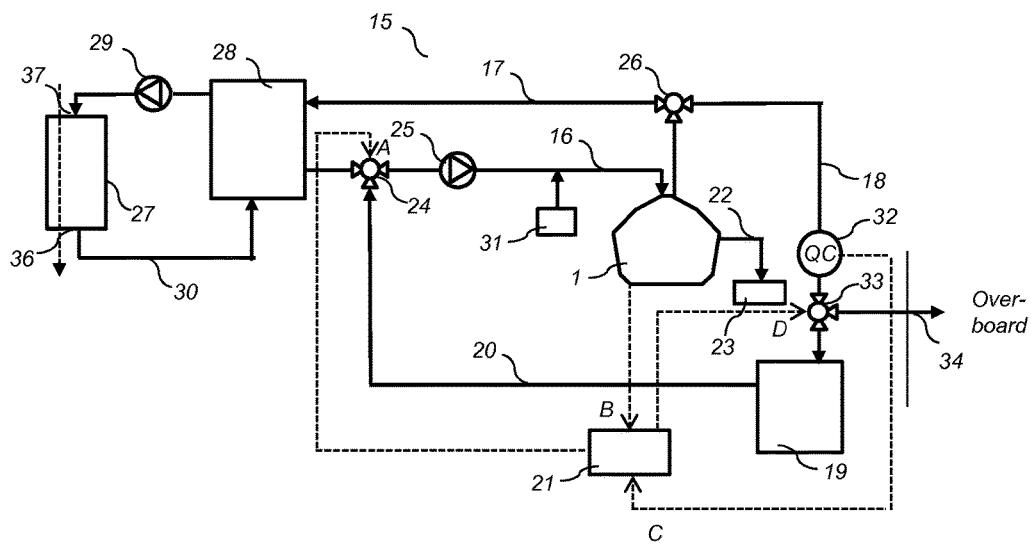
FIG. 3 shows a schematic drawing of an embodiment of a system of the present disclosure connected to a scrubber.

FIG. 3 shows a further embodiment of a system 15 for cleaning polluted scrubber fluid that is connected to a scrubber fluid loop 30.

The exhaust gas scrubber 27 acts on an exhaust conduit of a large diesel engine, such as the main or auxiliary engine of a ship. The scrubber is provided with a scrubber inlet 37 and a scrubber outlet 36 for scrubber fluid. The scrubber outlet 36 is connected to an inlet of a buffer tank 28 for scrubber water. The buffer tank 28 further comprises an outlet for providing scrubber water to the inlet 37 of the scrubber, via a scrubber feed pump 29. The scrubber 27, the buffer tank 28 and the piping connecting them form a closed scrubber fluid loop 30 in which scrubber water is being circulated during operation. The scrubber fluid loop 30 may further be provided with means for the addition of clean scrubber fluid, such as tap water, fresh water or desalinated seawater to the process during operation (not shown). This may be done in any part of the scrubber fluid loop 30. Scrubber water is transported from buffer tank 28 in the scrubber fluid loop 30 to, via a first transportation system 16 to the disc stack centrifugal separator 1. This is achieved by feed pump 25 arranged in the first transportation system 16. AS in the system of FIG. 1, the disc stack centrifugal separator is of a clarifier type, meaning that it discharges a pollutant phase from the periphery of the separating space via pipes 22 to the discharge tank 23. In this case, oil and particles are discharged in the same, single pollutant phase, whereas cleaned scrubber water is discharged via a liquid outlet at the top of the separator 1 and is transported via a second transportation system 17 back to the scrubber. The second transportation system 17 comprises pipes and a three-way valve 26, so that a smaller part of the cleaned scrubber water may be bled off via bleed-off transportation system 18 to a dirty drain tank 19. Thus, valve 26 may be changed so that it directs the cleaned scrubber water via transportation system 17 during a longer period of time than directing the cleaned scrubber water via bleed-off transportation system 18. The quality of the cleaned scrubber water in the bleed-off transportation system is controlled via quality control equipment 32, which is connected to the bleed-off transportation system 18. The quality control equipment 32 measures at least one property of the bled off cleaned scrubber water, such as pH, PAH and turbidity, and the bled off cleaned scrubber water may be discharged overboard by means of overboard transportation system 34, which is connected to three way valve 33 located downstream of quality control equipment 32 in the bleed-off transportation system 18.

The control unit 21 receives information from the quality control equipment 32 about the quality of the bled off cleaned scrubber water, as indicated by arrow C, and may thus regulate the three way valve 33, indicated by arrow D, in order to direct the bled off scrubber water overboard if certain quality criteria are fulfilled, or direct he bleed off scrubber water to the dirty drain tank 19 if the criteria are not fulfilled. Further, the control unit may also regulate the three-way valve 26 in the second transportation system 17, i.e. to regulate when to bleed-off the cleaned scrubber water in the second transportation system 17. The control unit further receives information related to the work load of the separator 1, as indicated by arrow B. When the centrifugal separator 1 has capacity, e.g. when the scrubber is not utilized, the control unit 21 initiates transport of scrubber water in dirty drain tank 19 via a waste reduction transportation system 20 comprising pipes back to a position that is upstream of the centrifugal separator 1, in this case to the first transportation system 16. This is achieved by controlling the three-way valve 24 in the first transportation system, as indicated by arrow A. The three way valve 24 is arranged upstream of the pump 25, so that the feed pump 25 may be utilized for transporting the scrubber water from the dirty drain tank to the separator 1 in order to retreat the scrubber water in the separator. Thus, by connecting the dirty drain tank 19 to the suction side of the feed pump 25, the waste reduction transportation system 20 may require only pipes. The feed pump 25 may then be utilized for pumping directly from the dirty drain tank 19 to the separator 1 and retreat earlier unsuccessfully treated scrubber water. The first transportation system 16 further comprises a chemical addition unit 31, which may measure and add a pH regulating agent to the scrubber water that is to be treated in the separator 1. As an example, the pH of the scrubber water in the dirty drain tank 19 may drop during storage, which means that the chemical addition unit 31 may add NaOH to the scrubber water that is to be retreated. As an alternative, the chemical addition unit 31 may be arranged for adding water with higher pH from a process tank to the scrubber water that is to be retreated. With the system 15, very dirty scrubber water may be re-treated several times until the overboard discharge criteria's are fulfilled and the water may be released overboard, thence reducing the waste volume that is otherwise sent for disposal ashore.

Figure 4:
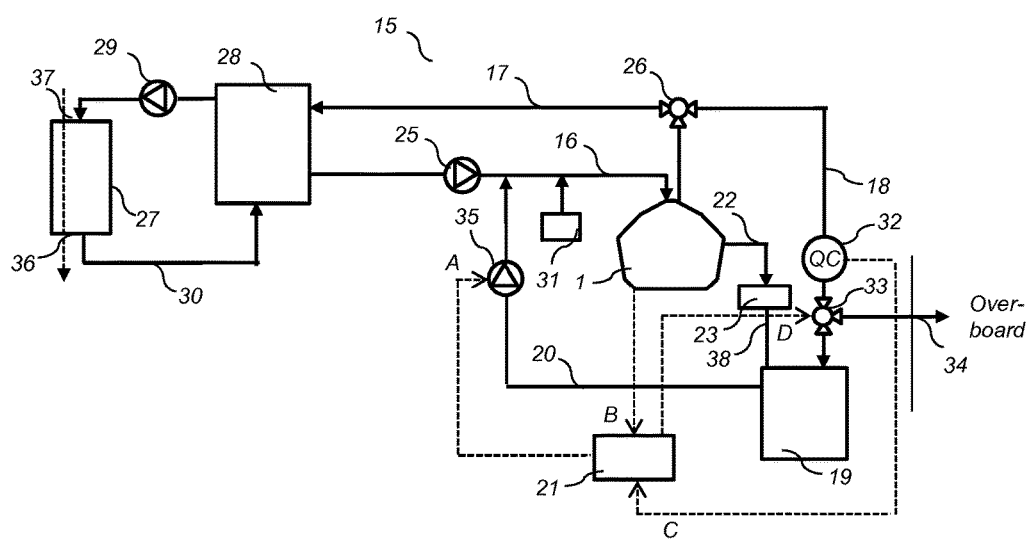
FIG. 4 shows a schematic drawing of another embodiment of a system of the present disclosure connected to a scrubber.

FIG. 4 shows a further embodiment of system 15 for cleaning polluted scrubber fluid that is connected to a scrubber fluid loop 30. The system 15 and scrubber fluid loop 30 functions the same as the system described in relation to FIG. 3 above, with the exception that the waste reduction transportation system 20 comprises a feed pump 35 of its own. Thus, the waste reduction transportation system 20 is connected to the first transportation system 16 downstream of the feed pup 25 of the first transportation system 16, and the control unit 21 regulates the transport of scrubber water from dirty drain tank 19 by means of controlling the feed pump 35 in the waste reduction transportation system 20, as indicated by arrow A in FIG. 4. Furthermore, the discharge tank 23 is connected to the dirty drain tank 19 by means of liquid transportation system 38. This means that the discharge tank 23 may be drained, i.e. leaving bottom phase, into the dirty drain tank to even further minimise the total waste for disposal.

Figure 5:
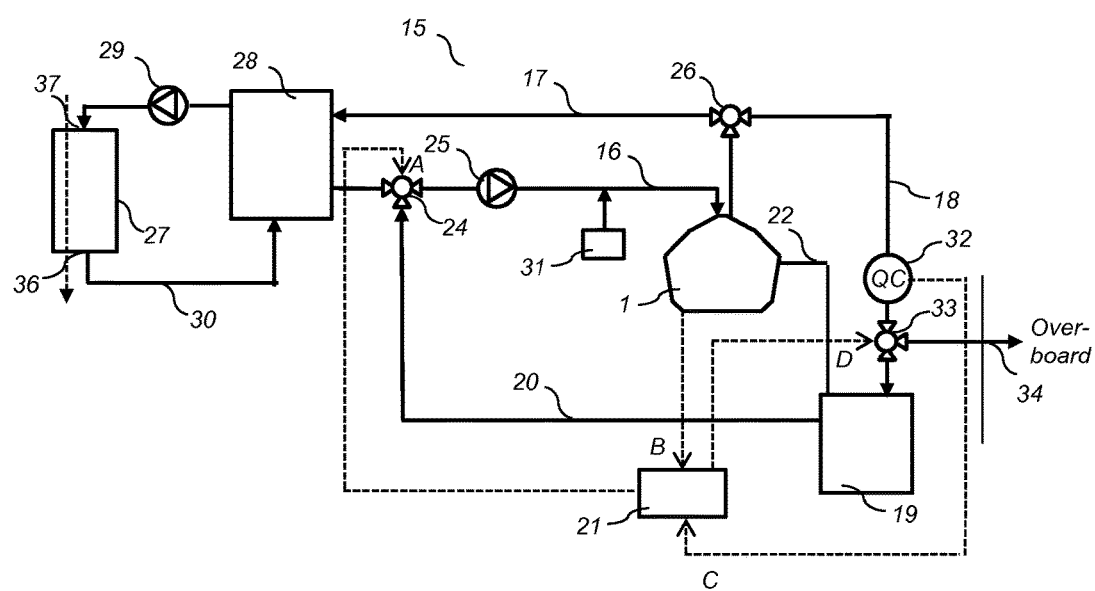
FIG. 5 shows a schematic drawing of a further embodiment of a system of the present disclosure connected to a scrubber.

FIG. 5 shows a further embodiment of system 15 for cleaning polluted scrubber fluid that is connected to a scrubber fluid loop 30. The system 15 and scrubber fluid loop 30 functions the same as the system described in relation to FIG. 3 above, with the exception that the system 15 comprises a common waste tank, i.e. the pollutant phase is discharged from the separator 1 to the dirty drain tank 19 instead of to a separate discharge tank. When such a combined waste tank is utilized, suction from the tank 19 to the waste reduction transportation system 20 is preferably located a safe distance up from the bottom of the tank 19, thereby omitting the highest concentration of solids that may form a cake when settling in the tank 19. As an example, suction from tank 19 could be from a position from the bottom of the tank 19 that is above 20% of the utilized tank height.

The invention claimed is:

1. A system for cleaning polluted scrubber fluid from an exhaust gas scrubber, comprising:
  a disc stack centrifugal separator for separating at least a pollutant phase and cleaned scrubber fluid from the polluted scrubber fluid, said separator comprising a rotor enclosing a separation space with a stack of separating discs, a separator inlet for polluted scrubber fluid extending into said separating space, a first separator outlet for cleaned scrubber fluid extending from said separating space, and a second separator outlet for a pollutant phase extending from said separating space;
  a first transportation system for transporting polluted scrubber fluid extending from an exhaust gas scrubber to the separator inlet;
  a second transportation system for transporting cleaned scrubber fluid extending from the first separator outlet back to the exhaust gas scrubber;
  a bleed-off transportation system connected to the second transportation system for bleeding off part of the cleaned scrubber fluid;
  a dirty drain tank connected to the bleed-off transportation system for receiving bled-off scrubber fluid;
  a waste reduction transportation system for transporting scrubber fluid extending from the dirty drain tank to the first transportation system; and
  a controller arranged for receiving information related to the work load of the disc stack centrifugal separator and for regulating the transport of scrubber fluid in the waste reduction transportation system based on said information.

2. The system according to claim 1, further comprising scrubber fluid quality control equipment connected to the bleed-off transportation system for measuring at least one property of the scrubber fluid in the bleed-off transportation system.

3. The system according to claim 2, further comprising an overboard transportation system for transporting scrubber fluid in the bleed-off transportation system overboard, and wherein the controller is further arranged for receiving information from the scrubber fluid quality control equipment and for regulating the transport of cleaned scrubber fluid between the dirty drain tank and overboard based on the information from the scrubber fluid quality control equipment.

4. The system according to claim 1, wherein the second separator outlet of the disc stack centrifugal separator is arranged at the periphery of the separation space and wherein the system further comprises a discharge waste tank connected to the second separator outlet.

5. The system according to claim 4, wherein the discharge waste tank is the same as the dirty drain tank.

6. The system according to claim 4, further comprising a liquid transportation system from the discharge waste tank to the dirty drain tank.

7. The system according to claim 1 further comprising a chemical addition unit connected to the first transportation system for addition of a pH regulating additive to the scrubber fluid in the first transportation system.

8. The system according to claim 1, wherein the bleed-off transportation system is free of any further centrifugal separator.

9. The system according to claim 1, wherein the second separator outlet of the disc stack centrifugal separator is arranged at the periphery of the separation space and the separator is free of any further outlets for pollutant phases.

10. A method for cleaning polluted scrubber fluid from an exhaust gas scrubber on-board a ship comprising the steps of:
transporting polluted scrubber fluid from the exhaust gas scrubber to an inlet of a disc stack centrifugal separator along a first transportation system;
separating the polluted scrubber fluid in the disc stack centrifugal separator and discharging cleaned scrubber fluid from a first separator outlet and a pollutant phase from a second separator outlet;
transporting cleaned scrubber fluid from the first separator outlet back to the exhaust gas scrubber along a second transportation system;
bleeding off part of the cleaned scrubber fluid that has been discharged from disc stack centrifugal separator from the second transportation system to a dirty drain tank; and
transporting scrubber fluid from the dirty drain tank through a waste reduction transportation system to a position upstream of the inlet of the disc stack centrifugal separator and retreating the scrubber fluid in the disc stack centrifugal separator and at the same time decreasing the transport of polluted scrubber fluid from the exhaust gas scrubber to the inlet of the disc stack centrifugal separator.

11. The method according to claim 10, further comprising the steps of:
measuring a parameter related to the quality of the cleaned scrubber fluid that has been bled-off before reaching the dirty drain tank; and
transporting the cleaned scrubber fluid that has been bled-off overboard instead of to the dirty drain tank if the measured parameter is within a specific range.

12. The method according to claim 10, wherein the second separator outlet of the disc stack centrifugal separator is arranged at the periphery of the separation space and the method further comprises the step of transporting the pollutant phase discharged through the second outlet to a discharge tank.

13. The method according to claim 10, further comprising:
transporting the pollutant phase to a discharge tank; and
draining a liquid phase from the discharge tank to the dirty drain tank.

14. The method according to claim 10, wherein the pollutant phase is transported to the dirty drain tank and transporting scrubber fluid from the dirty drain tank comprises the step of withdrawing a liquid phase from a position from the bottom of the tank that is above 20% of the total tank height and transporting said liquid phase to a position upstream of the inlet of the disc stack centrifugal separator.

15. The method according to claim 10, further comprising the step of adjusting the pH of the scrubber fluid transported from the dirty drain tank to a position upstream of the inlet of the disc stack centrifugal separator before being retreated in the disc stack centrifugal separator.

16. The system according to claim 2, wherein the second separator outlet of the disc stack centrifugal separator is arranged at the periphery of the separation space and wherein the system further comprises a discharge waste tank connected to the second separator outlet.

17. The system according to claim 1, wherein the first transportation system extends along a first path,
wherein the second transportation system extends along a second path, and
wherein the first path does not cross the second path.

18. The system according to claim 1, further comprising a valve at a junction of the first transportation system and the waste reduction transportation system.

19. The method according to claim 10, wherein the first transportation system extends along a first path,
wherein the second transportation system extends along a second path, and
wherein the first path does not cross the second path.

20. The method according to claim 10, further comprising supplying water from dirty drain tank to the separator when polluted scrubber fluid is not supplied to the separator from the exhaust gas scrubber by the first transportation system.

* * * * *